United States Patent
Kurabayashi et al.

(10) Patent No.: US 9,292,526 B2
(45) Date of Patent: Mar. 22, 2016

(54) CONTEXT-BASED CONTENT LIST GENERATION

(75) Inventors: Shuichi Kurabayashi, Fujisawa (JP); Naofumi Yoshida, Yokohama (JP); Kosuke Takano, Fujisawa (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 13/642,689

(22) PCT Filed: Feb. 24, 2012

(86) PCT No.: PCT/US2012/026524
§ 371 (c)(1),
(2), (4) Date: Oct. 22, 2012

(87) PCT Pub. No.: WO2013/126073
PCT Pub. Date: Aug. 29, 2013

(65) Prior Publication Data
US 2013/0226914 A1    Aug. 29, 2013

(51) Int. Cl.
*G06F 17/30* (2006.01)
(52) U.S. Cl.
CPC .... *G06F 17/30115* (2013.01); *G06F 17/30038* (2013.01)
(58) Field of Classification Search
CPC ........................ G06F 17/30247; G06F 17/3028
USPC ........................................................ 707/728
See application file for complete search history.

(56) References Cited

U.S. PATENT DOCUMENTS

| 7,373,173 | B2* | 5/2008 | Brittan et al. .............. 455/556.1 |
| 2006/0146765 | A1* | 7/2006 | Van De Sluis et al. ....... 370/338 |
| 2006/0212444 | A1 | 9/2006 | Handman et al. |
| 2006/0239648 | A1 | 10/2006 | Varghese |
| 2008/0194270 | A1 | 8/2008 | Greenberg |
| 2009/0047974 | A1 | 2/2009 | Quinn |
| 2009/0161994 | A1 | 6/2009 | Sauerwein |

(Continued)

FOREIGN PATENT DOCUMENTS

| CN | 102227908 A | 10/2011 |
| EP | 2 352 287 A1 | 8/2011 |
| WO | 2010/061889 A1 | 6/2010 |

OTHER PUBLICATIONS

International Search Report and Written Opinion from International Application No. PCT/US2012/26524 mailed Feb. 24, 2012.

(Continued)

*Primary Examiner* — Boris Gorney
*Assistant Examiner* — Kris Andersen
(74) *Attorney, Agent, or Firm* — Brundidge & Stanger, P.C.

(57) ABSTRACT

Technologies are generally described for providing a context-based content list for an electronic device. In some examples, a method performed under control of an electronic device may include gathering first information on or from one or more devices nearby the electronic device in response to a content file creation event on the electronic device; gathering second information on or from one or more devices nearby the electronic device in response to a content list creation event on the electronic device; calculating a similarity between the first information and the second information; and generating a content list based at least in part on the similarity between the first information and the second information.

22 Claims, 7 Drawing Sheets

(56) References Cited

U.S. PATENT DOCUMENTS

| | | | |
|---|---|---|---|
| 2009/0213245 A1 | 8/2009 | Harper et al. | |
| 2010/0093365 A1* | 4/2010 | Bloebaum | 455/456.1 |
| 2010/0194896 A1 | 8/2010 | Heimendinger | |
| 2010/0274859 A1 | 10/2010 | Bucuk | |
| 2011/0050564 A1* | 3/2011 | Alberth et al. | 345/156 |
| 2011/0218019 A1 | 9/2011 | Muramatsu | |
| 2011/0312344 A1* | 12/2011 | McCahill et al. | 455/456.1 |

OTHER PUBLICATIONS

Kjeldskov, et al., "Just-for-Us: A Context-Aware Mobile Information System Facilitating Sociality", Mobile HCI'05, Sep. 2005.

Thys, K., R. Thys, K. Luyten, and Karin Coninx. "PhotoFOAF: A Community Building Service Driven by Socially-Aware Mobile Imaging." In First International Workshop on Semantic Media Adaptation and Personalization, Dec. 2006. SMAP '06, 97-102, 2006. doi:10.1109/SMAP.2006.28.

"Home of WiSpy and insider," accessed at https://web.archive.org/web/20110202045650/http://www.metageek.net/?, p. 1, Feb. 2, 2011.

"Nintendo 3DS," accessed at https://web.archive.org/web/20120222152352/http://en.wikipedia.org/wiki/Nintendo_3DS, posted on Feb. 22, 2012, pp. 1-17.

Keiichiro, O., et al., "Contextual Photo Browser: photo management system using a photo participant information," IPSJ SIG technical reports, vol. 141, No. 1, pp. 1-7 (Jan. 14, 2011) (English Translation attached).

* cited by examiner

CONTEXT-BASED CONTENT LIST GENERATION

CROSS-REFERENCE TO RELATED APPLICATION

This Application is the National Stage filing under 35 U.S.C. §371 of PCT Application Ser. No. PCT/US12/26524 filed on Feb. 24, 2012.

BACKGROUND

Currently high-end mobile devices such as smartphones and tablet computers provide abundant storage for storing applications, media files and documents, etc., by providing the respective devices with high-capacity memories or by providing the respective devices with a connection to cloud-based storages. Further, users often use cameras included in the mobile devices to take photos and/or videos, and also store a large volume of such photos and/or videos in their mobile devices and/or the cloud-based storages. Also, the users often download various files such as, for example, media files and documents from other devices such as, for example, servers or other mobile devices, and store the downloaded files in their mobile devices and/or the cloud-based storages.

Some users manage their content files using a conventional file managing scheme such as, for example, folder classification and/or keyword-based tagging. However, such a conventional file managing scheme requires extra efforts of the users, in that the users should store data in suitable folders and/or add suitable keywords and tags in advance. Furthermore, even with the file managing scheme, it is still difficult for the users to easily find and select the desired files from storage in which a large number of files are stored.

SUMMARY

In an example, a method performed under control of an electronic device may include: gathering first information on or from one or more devices nearby the electronic device in response to a content file creation event on the electronic device; gathering second information on or from one or more devices nearby the electronic device in response to a content list creation event on the electronic device; calculating a similarity between the first information and the second information; and generating a content list based at least in part on the similarity between the first information and the second information.

In an example, a method performed under control of an electronic device may include: detecting a content file creation event; gathering information on or from one or more devices nearby the electronic device; and storing a content file with the information on or from the one or more nearby devices as metadata corresponding to the created content file.

In an example, a method performed under control of an electronic device may include: detecting a content list creation event; gathering information on or from one or more devices nearby the electronic device; calculating one or more similarities between the information on or from the one or more nearby devices and metadata corresponding to one or more content files stored in a storage; and generating a content list based at least in part on the calculated one or more similarities.

In an example, an electronic device may include: a nearby device information gathering unit configured to obtain information regarding one or more devices nearby the electronic device; a content ranking unit configured to determine relevance of one or more content files stored in a storage based at least in part on the information regarding the one or more nearby devices when a content list creation event is triggered; and a content list presenting unit configured to present a content list in order of the relevance determined by the content ranking unit when the content list creation event is triggered.

In an example, a computer-readable storage medium may store a program for causing an electronic device to present a content list, the program including: a nearby device information gathering module configured to obtain information regarding one or more devices nearby the electronic device; and a content ranking module configured to determine relevance of one or more content files stored in the electronic device based at least in part on the information regarding one or more nearby devices when a content list creation event is triggered.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a context-based content list generation scheme.

Technologies are generally described for generating a list of content files such as, for example, a list of photos, videos or documents in an electronic device such as, for example, a smartphone and a tablet computer. In some examples, the electronic device may generate the list of the content files in order of similarities or relevancies between a context at the time of generating the content files and a context at the time of generating the list of the content files. In some examples, the electronic device may determine the display order of the list of the content files by considering where the electronic device is located, which devices are located near the electronic device, and so on, both at the time of generating the content files and at the time of generating the list of the content files.

In some examples, when a content file creation event is triggered on the electronic device, the electronic device may gather first information on or from one or more devices nearby the electronic device (e.g., Wi-Fi and/or Bluetooth MAC addresses of the nearby devices), and store a content file with the first information as metadata corresponding to the created content file. Then, when a content list creation event is triggered on the electronic device, the electronic device may gather second information on or from one or more devices nearby the electronic device (e.g., Wi-Fi and/or Bluetooth MAC addresses of the nearby devices). Then, the electronic device may calculate similarities between the first information and the second information, and generate the list of the content files based at least in part on the similarity between the first information and the second information.

In some examples, the content file creation event and the content list creation event are respectively triggered by an input from a user of the electronic device. In some examples, the content file creation event may be triggered when the user captures a photo with a camera in the electronic device, and the content list creation event may be triggered when the user activates a photo viewing application or a photo editing application in the electronic device. In other examples, the content file creation event may be triggered when the user captures a video with a camera in the electronic device, and the content list creation event may be triggered when the user activates a video playing application or a video editor application in the electronic device. In still further examples, the content file creation event may be triggered when the user receives or tries to receive a file from other devices, and the content list creation event may be triggered when the user activates an editor or a viewer for the received file.

In some examples, the electronic device may identify one or more nearby devices in the vicinity of the electronic device by detecting Wi-Fi and/or Bluetooth MAC addresses of the nearby devices, both at the time when the user creates or stores content files (e.g., photos, videos or documents) and at the time when the user tries to browse the content files, and generate or display the list of the content files in order of similarities in the nearby devices. Accordingly, the user can immediately select a desired content file among multiple content files without the extra effort such as adding tags, classifying folders, and/or managing filenames, etc.

By way of example, but not limitation, a user of an electronic device, such as a smartphone, may store materials distributed in college classes in his/her smartphone, take photos with his/her family and/or friends and store the photos in his/her smartphone and/or a cloud-based storage, and save document files distributed at his/her office in his/her smartphone and/or the cloud-based storage. When the user activates a photo viewing application or a photo editing application on his/her smartphone at home, the smartphone may detect smartphones of other users located in the vicinity of the user (e.g., family members), gather information such as, for example, MAC addresses of the smartphones of the family members, and may display photos taken with the family members and/or a list thereof preferentially.

When friends of the user are visiting the user and are located closer to the user than the family members are, the user's smartphone may detect smartphones of the friends, and gather information such as, for example, MAC addresses of the smartphones of the friends. In such cases, when the user activates the photo viewing application or the photo editing application, the smartphone of the user may display a content list in which photos with the friends (who are located closer to the user than the family members) are ranked first and photos with family members are ranked second.

When the user activates a file viewer or editor on his/her smartphone in a classroom or office setting, the smartphone of the user may detect MAC addresses of smartphones of other users located in the vicinity of the user (e.g., classmates and/or workplace colleagues), and display a list of materials for the class or meeting preferentially, while in cases where the user activates the file viewer or editor on his/her smartphone in another classroom or meeting setting, the smartphone of the user may detect MAC addresses of smartphones of other users located in the vicinity of the user (e.g., classmates and/or colleagues), and display a list of materials for the other class or meeting preferentially.

Figure 1:
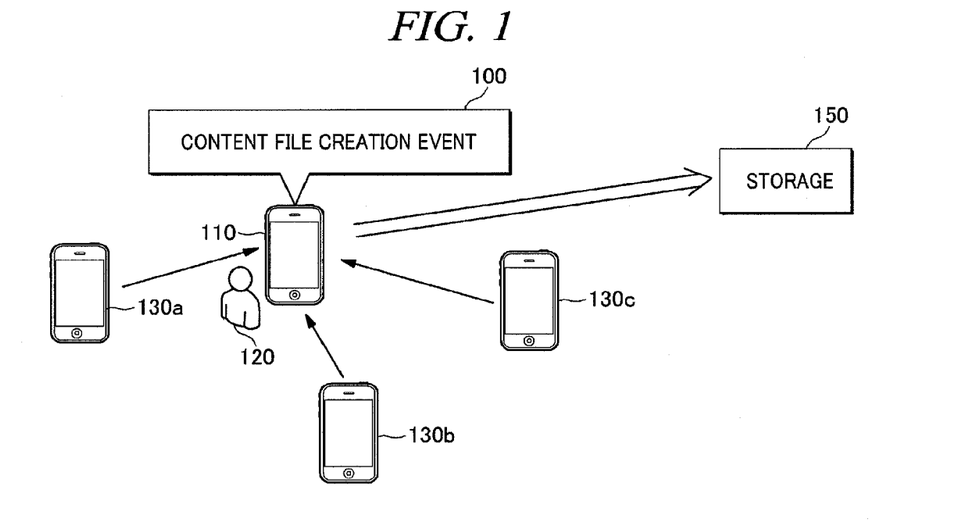
FIG. 1 schematically shows an illustrative example of an environment where an electronic device may create and store a content file, arranged in accordance with at least some embodiments described herein.

FIG. 1 schematically shows an illustrative example of an environment where an electronic device may create and store a content file, arranged in accordance with at least some embodiments described herein.

As depicted, when a content file creation event 100 is triggered in an electronic device 110 by a user 120 who desires to create a content file, electronic device 110 may gather information on or from other devices located in the vicinity of electronic device 110 to identify a context at the time of generating the content file. In the example embodiments described with reference to FIG. 1, electronic device 110 may gather information on or from devices 130*a*, 130*b* and 130*c* in the vicinity of electronic device 110. By way of example, but not limitation, devices 130*a*, 130*b* and 130*c* may be mobile devices controlled by other user or non-mobile devices including, for example, a base station of wireless local area network (LAN).

In some embodiments, content file creation event 100 may be triggered when user 120 captures a photo or a video with a camera (not shown) in electronic device 110, receives or downloads a file from any other devices, etc.

In some embodiments, electronic device 110 may identify the other devices located in the vicinity of electronic device 110 using at least one of Bluetooth, Wi-Fi and global positioning system (GPS). By way of example, but not limitation, in cases of using Wi-Fi, electronic device 110 may gather the information on or from devices located within Wi-Fi range (typically of a radius of about 100 ft (30 m) indoors or about 300 ft (90 m) outdoors), while in cases of using Bluetooth, electronic device 110 may gather the information on or from devices located within Bluetooth range (typically 32 ft (10 m) or less) from electronic device 110.

In some embodiments, the information on or from devices 130a, 130b and 130c may be associated with identifiers of devices 130a, 130b and 130c. By way of example, but not limitation, the information on or from devices 130a, 130b and 130c may be media access control (MAC) addresses or service set identifiers (SSIDs) of devices 130a, 130b and 130c.

In some embodiments, electronic device 110 may store in storage 150 the content file with the information on or from devices 130a, 130b and 130c as metadata corresponding to the created content file. Storage 150 may be a component of electronic device 110 or a separate cloud-based storage.

Although FIG. 1 illustrates that electronic device 110 may gather the information on or from three devices 130a, 130b and 130c in the vicinity of electronic device 110, one skilled in the art will appreciate that electronic device 110 may gather information on or from any number of devices in the vicinity of electronic device 110.

Figure 2:
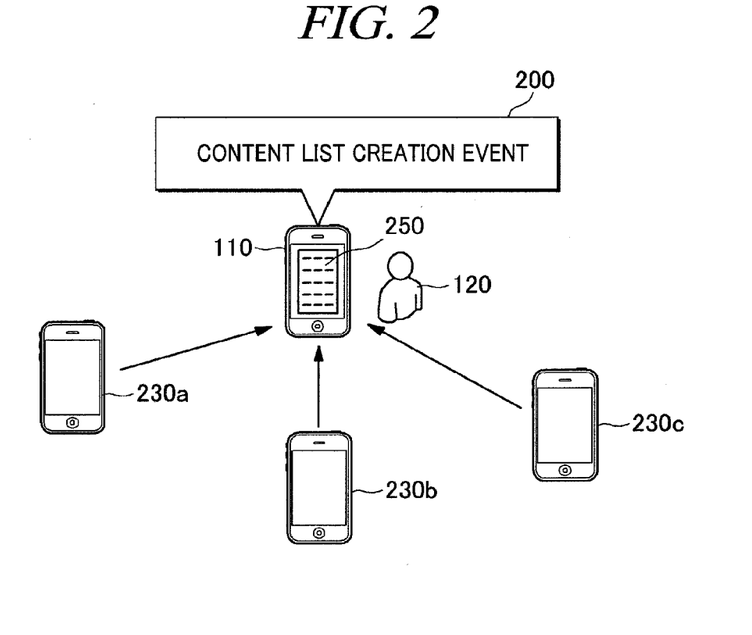
FIG. 2 schematically shows an illustrative example of an environment where an electronic device may create a content list, arranged in accordance with at least some embodiments described herein.

FIG. 2 schematically shows an illustrative example of an environment where an electronic device may create a content list, arranged in accordance with at least some embodiments described herein.

As depicted, when a content list creation event 200 is triggered in electronic device 110 by user 120 who desires browsing content files and/or creating a content list of the content files, electronic device 110 may gather information on or from other devices located in the vicinity of electronic device 110 to identify a context at the time of generating the content list. In the example embodiments described with reference to FIG. 2, electronic device 110 may gather information on or from devices 230a, 230b and 230c located in the vicinity of electronic device 110 when content list creation event 200 is triggered. In some embodiments, content list creation event 200 may be triggered when user 120 activates a photo viewing application or a photo editing application, a video playing application or a video editor application, or a document editor or a document viewer, etc.

In some embodiments, electronic device 110 may identify the other devices located in the vicinity of electronic device 110 using at least one of Bluetooth, Wi-Fi and GPS. By way of example, but not limitation, in cases of using Wi-Fi, electronic device 110 may gather the information on or from devices located within the Wi-Fi range (typically of a radius of about 100 ft (30 m) indoors or about 300 ft (90 m) outdoors) from electronic device 110, while in cases of using Bluetooth, electronic device 110 may gather the information on or from devices located within the Bluetooth range (typically 32 ft (10 m) or less) from electronic device 110.

In some embodiments, the information on or from devices 230a, 230b and 230c may be associated with identifiers of devices 230a, 230b and 230c. By way of example, but not limitation, the information on or from devices 230a, 230b and 230c may be MAC addresses or SSIDs of devices 230a, 230b and 230c.

Then, in some embodiments, electronic device 110 may compare the context identified in response to content list creation event 200 with one or more contexts previously identified in response to one or more content file creation events 100 and stored in storage 150. In some embodiments, electronic device 110 may calculate one or more similarities between the information on or from the devices in the vicinity of electronic device 110 when content list creation event 200 is triggered (e.g., devices 230a, 230b and 230c) and metadata corresponding to the one or more content files stored in storage 150. In some embodiments, electronic device 110 may calculate the similarities between the MAC addresses or SSIDs of devices in the vicinity of electronic device 110 at the time of detecting content list creation event 200 (e.g., devices 230a, 230b and 230c) and MAC addresses or SSIDs of devices in the vicinity of electronic device 110 at the time of detecting content file creation events 100.

In some embodiments, electronic device 110 may calculate the similarities between the MAC addresses or SSIDs of the devices in the vicinity of electronic device 110 at the time of detecting content list creation event 200 (e.g., devices 230a, 230b and 230c) and MAC addresses or SSIDs of the devices in the vicinity of electronic device 110 at the time of detecting content file creation events 100, using a set coverage ratio. In cases in which $S_i$ denotes a set of MAC addresses or SSIDs of the devices in the vicinity of electronic device 110 at the time of creating or storing $i^{th}$ one of the content files, and R denotes a set of MAC addresses or SSIDs of the devices in the vicinity of electronic device 110 at the time of creating the content list, the set coverage ratio may be defined by an example Formula 1 as follows:

$$\frac{|S_i \cap R| - |R - S_i|}{|S_i|} \quad \text{[Formula 1]}$$

As such, the set coverage ratio may be calculated by subtracting the size of the difference set of R and $S_i$ from the size of the intersection of $S_i$ and R, and dividing the result by the size of $S_i$. In some embodiments, the similarity between $S_i$ and R may be associated with (e.g., be proportional to) the set coverage ratio.

In some embodiments, electronic device 110 may calculate the similarities between the MAC addresses or SSIDs of the devices in the vicinity of electronic device 110 at the time of detecting content list creation event 200 (e.g., devices 230a, 230b and 230c) and MAC addresses or SSIDs of the devices in the vicinity of electronic device 110 at the time of detecting content file creation events 100, using an area of a cluster of the devices in the vicinity of electronic device 110 at the time of detecting content list creation event 200 (e.g., devices 230a, 230b and 230c). In some embodiments, the area of the cluster of the devices may be calculated as an area of a polygon formed by locations of the devices, which may be detected by using GPS. For example, in cases in which $\vec{p}_k$ denotes a location vector of the location of $k^{th}$ device among n devices, the area of the polygon formed by the locations of the devices may be calculated by an example Formula 2 as follows:

$$\frac{1}{2}\sum_{k=1}^{n} \vec{p}_k \times \vec{p}_{k+1}, \text{ where } \vec{p}_{n+1} = \vec{p}_1 \quad \text{[Formula 2]}$$

Figure 3:
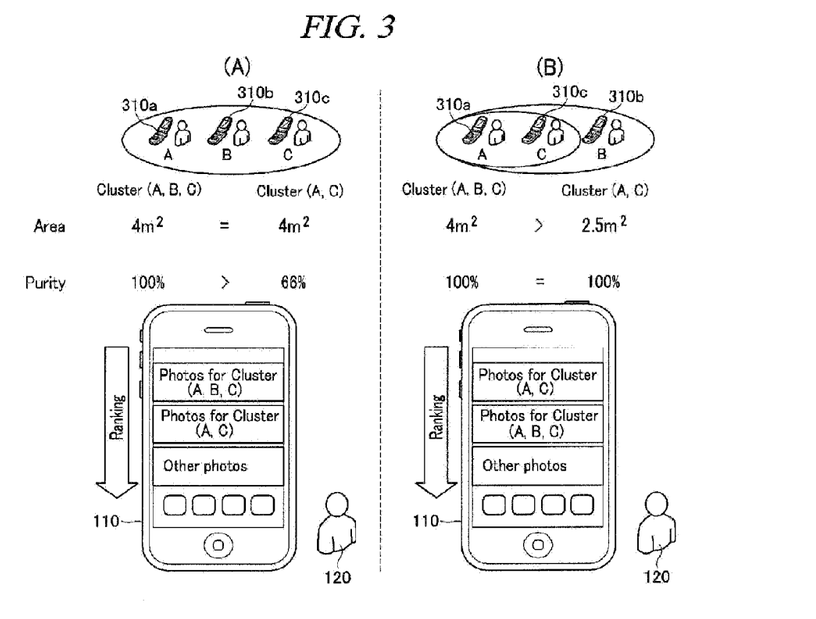
FIGS. 3(A)-(B) schematically show illustrative examples of content list creation, arranged in accordance with at least some embodiments described herein.

In some embodiments, using the area of the cluster of the devices in the vicinity of electronic device 110 at the time of detecting content list creation event 200 (e.g., devices 230a, 230b and 230c) calculated in accordance with Formula 2, electronic device 110 may calculate the similarities between the MAC addresses or SSIDs of the devices in the vicinity of electronic device 110 at the time of detecting content list creation event 200 (e.g., devices 230a, 230b and 230c), and MAC addresses or SSIDs of the devices in the vicinity of electronic device 110 at the time of detecting content file creation events 100. Illustrative examples of content list creation using the similarities calculated based at least in part on the area of the cluster of the devices will be described below in more detail with reference to FIGS. 3(A)-(B).

In some embodiments, electronic device 110 may calculate the similarities between the MAC addresses or SSIDs of the devices in the vicinity of electronic device 110 at the time of detecting content list creation event 200 (e.g., devices 230*a*, 230*b* and 230*c*) and MAC addresses or SSIDs of the devices in the vicinity of electronic device 110 at the time of detecting content file creation events 100, using distances between any two of the devices in the vicinity of electronic device 110 at the time of detecting content list creation event 200 (e.g., devices 230*a*, 230*b* and 230*c*). In some embodiments, the distances among the devices may be calculated using intensity of at least one of a Wi-Fi signal and a Bluetooth signal.

In some embodiments, electronic device 110 may generate a content list 250 based at least in part on the calculated similarities. In some embodiments, electronic device 110 may list at least a part of the one or more content files stored in storage 150 in order of the similarities between the information on or from devices 230*a*, 230*b* and 230*c* and metadata corresponding to the one or more content files. In some embodiments, electronic device 110 may make a list including thumbnails of at least a part of the one or more content files stored in storage 150.

Although FIG. 2 illustrates that electronic device 110 may gather the information on or from three devices 230*a*, 230*b* and 230*c* in the vicinity of electronic device 110, one skilled in the art will appreciate that electronic device 110 may gather information on or from any number of devices in the vicinity of electronic device 110.

FIGS. 3(A)-(B) schematically show illustrative examples of content list creation, arranged in accordance with at least some embodiments described herein.

In the example embodiments described with reference to FIGS. 3(A)-(B), it is assumed that user 120 has stored multiple photos in a storage (e.g., storage 150), one of which was taken in the vicinity of three devices 310*a*, 310*b* and 310*c*, and another of which was taken in the vicinity of two devices 310*a* and 310*c*. In FIGS. 3(A)-(B), Cluster (A, B, C) denotes a cluster consisting of devices 310*a*, 310*b* and 310*c*, while Cluster (A, C) denotes a cluster consisting of devices 310*a* and 310*c*. In cases in which electronic device 110 determines that Cluster (A, B, C) is most similar to context at the time of creating a content list (e.g., a list of photos), electronic device 110 may list the photo taken in the vicinity of three devices 310*a*, 310*b* and 310*c* at the top, while in cases in which electronic device 110 determines that Cluster (A, C) is most similar to the context at the time of creating the content list, electronic device 110 may list the photo taken in the vicinity of two devices 310*a* and 310*c* at the top.

As depicted in FIGS. 3(A)-(B), electronic device 110 may calculate an area and a purity of each cluster, and define the similarity as the purity divided by the area. In some embodiments, the areas of the clusters may be calculated using Formula 2 described above.

In the example embodiments illustrated in FIG. 3(A), the area of Cluster (A, B, C) may be same as the area of Cluster (A, C), but the purity of Cluster (A, B, C) may be higher than the purity of Cluster (A, C). In such cases, electronic device 110 may determine that the similarity for Cluster (A, B, C) may be higher than the similarity for Cluster (A, C), and thus list the photo taken in the vicinity of devices 310*a*, 310*b* and 310*c* at the top.

In the example embodiments illustrated in FIG. 3(B), the purity of Cluster (A, B, C) may be the same as the purity of Cluster (A, C), but the area of Cluster (A, B, C) may be larger than the area of Cluster (A, C). In such cases, electronic device 110 may determine that the similarity for Cluster (A, C) may be higher than the similarity for Cluster (A, B, C), and thus list the photo taken in the vicinity of devices 310*a* and 310*c* at the top.

Although FIGS. 3(A)-(B) illustrate that electronic device 110 may calculate the similarities using the area of the cluster of the devices, one skilled in the art will appreciate that electronic device 110 may use the distances among the devices instead of the area of the cluster of the devices.

Figure 4:
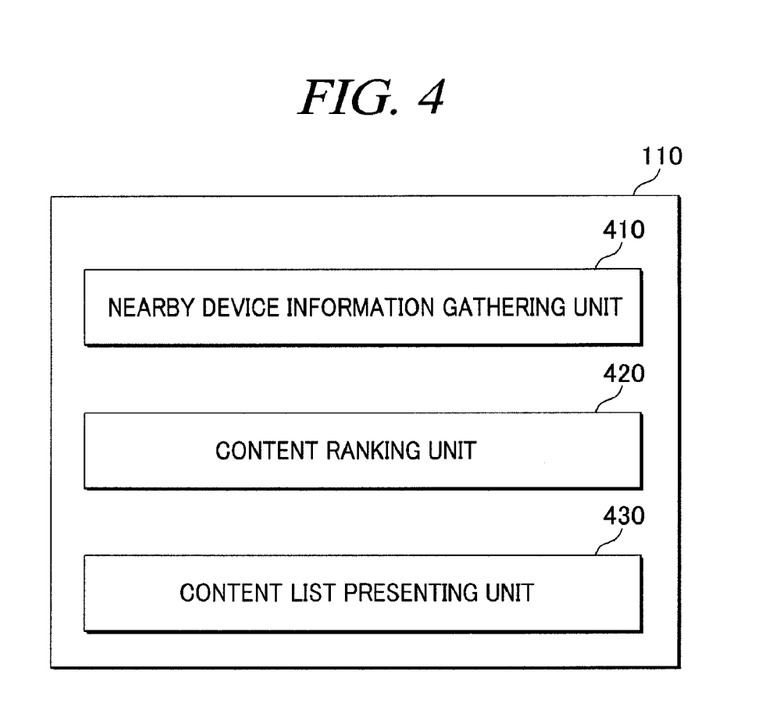
FIG. 4 shows a schematic block diagram illustrating an example architecture for providing a context-based content list generation scheme for an electronic device, arranged in accordance with at least some embodiments described herein.

FIG. 4 shows a schematic block diagram illustrating an example architecture for providing a context-based content list generation scheme for an electronic device, arranged in accordance with at least some embodiments described herein.

As depicted, electronic device 110 may include a nearby device information gathering unit 410, a content ranking unit 420 and a content list presenting unit 430. Although illustrated as discrete components, various components may be divided into additional components, combined into fewer components, or eliminated altogether while being contemplated within the scope of the disclosed subject matter.

Nearby device information gathering unit 410 may be configured to obtain information regarding one or more nearby devices in the vicinity of electronic device 110. In some embodiments, nearby device information gathering unit 410 may obtain the information regarding the one or more nearby devices when at least one of a content file creation event (e.g., content file creation event 100) and a content list creation event (e.g., content list creation event 200) is triggered.

In some embodiments, nearby device information gathering unit 410 may obtain the information regarding the one or more nearby devices using at least one of Bluetooth, Wi-Fi and GPS. By way of example, but not limitation, the information regarding the nearby devices may be associated with identifiers of the nearby devices such as, for example, MAC addresses or SSIDs of the nearby devices.

Content ranking unit 420 may be configured to determine relevance of one or more content files stored in a storage (e.g., storage 150) based at least in part on the information regarding the one or more nearby devices which may be obtained by nearby device information gathering unit 410, when a content list creation event is triggered. In some embodiments, content ranking unit 420 may calculate one or more similarities between one or more metadata of the one or more content files previously stored in the storage and newly obtained information on or from one or more nearby devices when the content list creation event is triggered.

Content list presenting unit 430 may be configured to present a content list in order of the relevance which may be determined by content ranking unit 420, when the content list creation event is triggered. In some embodiments, content list presenting unit 430 may list at least a part of the one or more content files in order of the similarities calculated by content ranking unit 420.

In some embodiments, electronic device 110 may optionally include the storage. In some embodiments, the storage may store the one or more content files with the information regarding the nearby devices obtained by nearby device information gathering unit 410 in response to one or more content file creation events.

Figure 5:
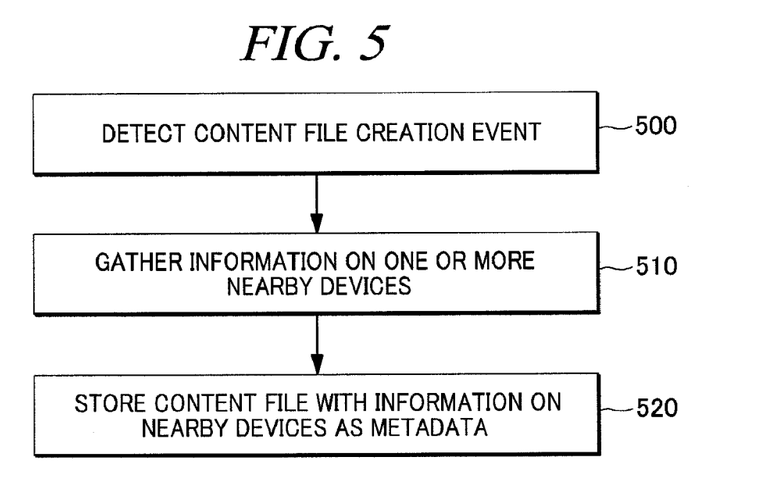
FIG. 5 shows an example flow diagram of a process of creating a content file for providing a context-based content list generation scheme for an electronic device, arranged in accordance with at least some embodiments described herein.

FIG. 5 shows an example flow diagram of a process of creating a content file for providing a context-based content list generation scheme for an electronic device, arranged in accordance with at least some embodiments described herein.

The method in FIG. 5 may be implemented in an electronic device (e.g., electronic device 110) including nearby device information gathering unit 410, content ranking unit 420 and content list presenting unit 430. An example process may include one or more operations, actions, or functions as illustrated by one or more blocks 500, 510 and/or 520. Although illustrated as discrete blocks, various blocks may be divided into additional blocks, combined into fewer blocks, or eliminated, depending on the desired implementation. Processing may begin at block 500.

At block 500, the electronic device may detect a content file creation event. In some embodiments, the content file creation event may be triggered when a user of the electronic device tries to create a content file, such as, for example, by capturing a photo or a video with a camera in the electronic device, or receiving or downloading a file from any other devices, etc. Processing may continue from block 500 to block 510.

At block 510, the electronic device may gather information on or from one or more nearby devices in the vicinity of the electronic device. By way of example, but not limitation, the nearby devices may be mobile devices controlled by other user or non-mobile devices including, for example, a base station of wireless local area network (LAN). In some embodiments, the electronic device may obtain the information on or from the nearby devices using at least one of Bluetooth, Wi-Fi and GPS. By way of example, but not limitation, the information may be associated with identifiers of the nearby devices such as, for example, MAC addresses or SSIDs of the nearby devices. Processing may continue from block 510 to block 520.

At block 520, the electronic device may store the content file with the information on or from the nearby devices as metadata corresponding to the created content file. The storage may be a component of the electronic device or a separate cloud-based storage.

Figure 6:
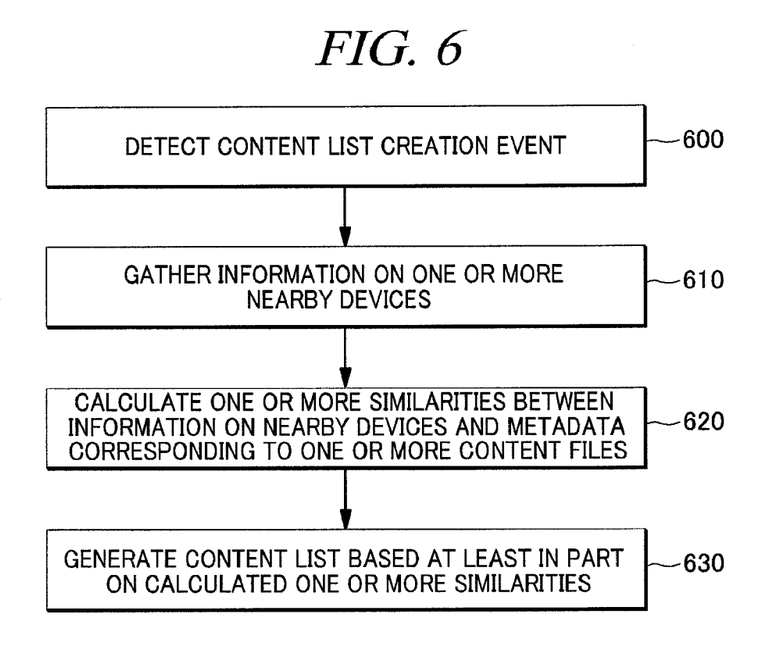
FIG. 6 shows an example flow diagram of a process of creating a content list for providing a context-based content list generation scheme for an electronic device, arranged in accordance with at least some embodiments described herein.

FIG. 6 shows an example flow diagram of a process of creating a content list for providing a context-based content list generation scheme for an electronic device, arranged in accordance with at least some embodiments described herein.

The method in FIG. 6 may be implemented in an electronic device (e.g., electronic device 110) including nearby device information gathering unit 410, content ranking unit 420 and content list presenting unit 430. An example process may include one or more operations, actions, or functions as illustrated by one or more blocks 600, 610, 620 and/or 630. Although illustrated as discrete blocks, various blocks may be divided into additional blocks, combined into fewer blocks, or eliminated, depending on the desired implementation. Processing may begin at block 600.

At block 600, the electronic device may detect a content list creation event. In some embodiments, the content list creation event may be triggered when the user tries to browse the content files stored in a storage, such as, for example, by activating a photo viewing application, a photo editing application, a video playing application, a video editor application, a document editor or a document viewer, etc. Processing may continue from block 600 to block 610.

At block 610, the electronic device may gather information on or from one or more nearby devices in the vicinity of the electronic device. By way of example, but not limitation, the nearby devices may be mobile devices controlled by other user or non-mobile devices including, for example, a base station of wireless local area network (LAN). Processing may continue from block 610 to block 620.

At block 620, the electronic device may calculate one or more similarities between the information on or from the nearby devices and metadata corresponding to one or more content files stored in the storage. By way of example, but not limitation, the electronic device may calculate the similarities by calculating a set coverage ratio in accordance with Formula 1 above, or by calculating an area of a cluster of the one or more nearby devices, or by calculating distances between any two of the nearby devices. Processing may continue from block 620 to block 630.

At block 630, the electronic device may generate a content list based at least in part on the calculated one or more similarities. In some embodiments, the electronic device may list at least a part of the one or more content files in order of the calculated similarities. In some embodiments, the electronic device may make a list including thumbnails of at least a part of the one or more content files.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
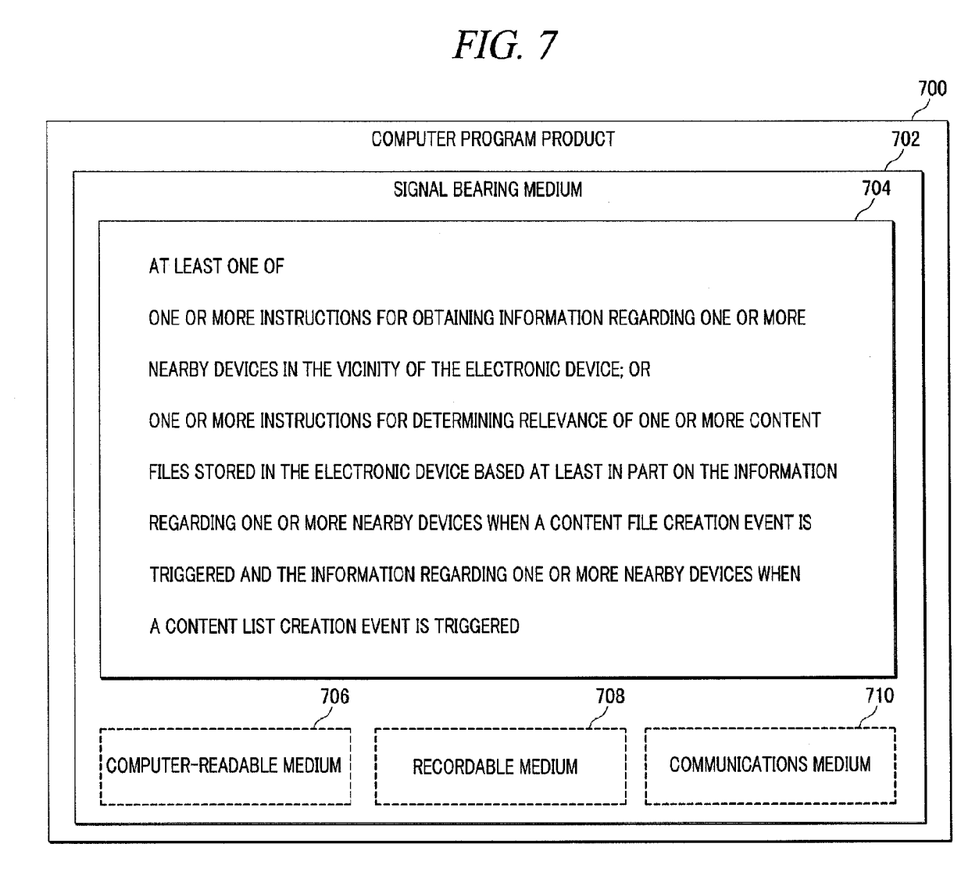
FIG. 7 illustrates a computer program product that can be utilized to provide a content list generation scheme for an electronic device, arranged in accordance with at least some embodiments described herein.

FIG. 7 illustrates a computer program product 700 that may be utilized to provide a content list generation scheme for an electronic device, arranged in accordance with at least some embodiments described herein.

Computer program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for obtaining information regarding one or more nearby devices in the vicinity of the electronic device; one or more instructions for determining relevance of one or more content files stored in the electronic device based at least in part on the information regarding one or more nearby devices when a content file creation event is triggered and the information regarding one or more nearby devices when a content list creation event is triggered. Thus, for example, referring to FIG. 4, electronic device 110 may undertake one or more of the blocks shown in FIGS. 5 and 6 in response to instructions 704.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, Computer program product 700 may be conveyed to one or more modules of electronic device 110 by an RF signal bearing medium 702, where the signal bearing medium 702 is conveyed by a wireless communications medium 710 (e.g., a wireless communications medium conforming with the IEEE 802.11 standard).

Figure 8:
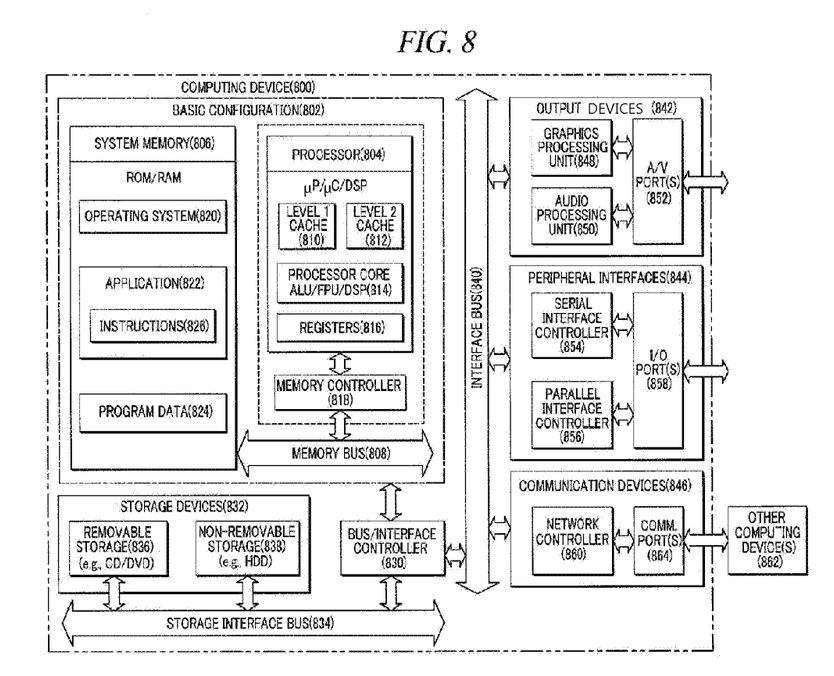
FIG. 8 is a block diagram illustrating an example computing device that can be utilized to provide a content list generation scheme for an electronic device, arranged in accordance with at least some embodiments described herein.

FIG. 8 is a block diagram illustrating an example computing device 800 that can be utilized to provide a content list generation scheme for an electronic device, arranged in accordance with at least some embodiments described herein.

In these examples, elements of computing device 800 may be arranged or configured for an electronic device (e.g., electronic device 110). In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include instructions 826 that may be arranged to perform the functions as described herein including the actions described with respect to the electronic device 110 architecture as shown in FIG. 4 or including the actions described with respect to the flow charts shown in FIGS. 5-6. Program data 824 may include any data that may be utilized for implementing instructions 826. In some examples, application 822 may be arranged to operate with program data 824 on an operating system 820 such that implementations for instructions for the electronic device as described herein.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an electronic device, comprising:
    gathering first information from one or more devices nearby the electronic device in response to a content file creation event on the electronic device, the first information being associated with identifiers of the one or more devices;
    gathering second information from one or more devices nearby the electronic device in response to a content list creation event on the electronic device, the second information being associated with identifiers of the one or more nearby devices when the content list creation event is triggered;
    calculating a similarity between the first information and the second information, the calculating comprising:
        calculating a set coverage ratio by:
            calculating a size of a difference between a first set of identifiers of the one or more nearby devices when the content file creation event is triggered and a second set of identifiers of the one or more nearby devices when the content list creation event is triggered,
            subtracting the calculated size of the difference from a size of an intersection of the first set of identifiers and the second set of identifiers, and
            dividing a result of the subtracting by the size of the first set of identifiers resulting in the calculated set coverage ratio, wherein the calculated similarity increases proportionally to the calculated set coverage ratio,
        identifying locations of the one or more devices nearby the electronic device when the content list creation event is triggered, and
        calculating an area of a cluster of the one or more nearby devices based on an area formed by the identified locations of the one or more devices nearby the electronic device when the content list creation event is triggered, wherein the calculated similarity increases inversely proportionally to the calculated area; and
    generating a content list based at least in part on the calculated similarity between the first information and the second information.

2. The method of claim 1, wherein the content file creation event is triggered by a user input.

3. The method of claim 1, wherein the content list creation event is triggered by a user input.

4. The method of claim 1, wherein the content file creation event includes capturing a photo, and the content list creation event includes activating a photo viewing application or a photo editing application.

5. The method of claim 1, wherein the content file creation event includes capturing a video, and the content list creation event includes activating a video playing application or a video editor application.

6. The method of claim 1, wherein the content file creation event includes receiving a file, and the content list creation event includes activating an editor or a viewer for the received file.

7. The method of claim 1, wherein the gathering of the first information includes gathering the first information using at least one of Bluetooth, Wi-Fi and global positioning system (GPS).

8. The method of claim 1, wherein the gathering of the second information includes gathering the second information using at least one of Bluetooth, Wi-Fi and GPS.

9. The method of claim 1, wherein the first set of identifiers include media access control (MAC) addresses of the one or more nearby devices when the content file creation event is triggered.

10. The method of claim 1, wherein the first set of identifiers include service set identifiers (SSIDs) of the one or more nearby devices when the content file creation event is triggered.

11. The method of claim 1, wherein the second set of identifiers include media access control (MAC) addresses of the one or more nearby devices when the content list creation event is triggered.

12. The method of claim 1, wherein the second set of identifiers include service set identifiers (SSIDs) of the one or more nearby devices when the content list creation event is triggered.

13. The method of claim 1, wherein the calculating the area of the cluster of the one or more nearby devices is based at least in part on intensity of at least one of a Wi-Fi signal and a GPS signal.

14. The method of claim 1, wherein the calculating the similarity between the first information and the second information further includes calculating distances between any two of the one or more nearby devices when the content list creation event is triggered, and the similarity increases when the calculated distance decreases.

15. The method of claim 14, wherein the calculating distances between any two of the one or more nearby devices is based at least in part on intensity of at least one of a Wi-Fi signal and a Bluetooth signal.

16. A method performed under control of an electronic device, comprising:
   detecting a content list creation event;
   gathering information from one or more devices nearby the electronic device, the information being associated with identifiers of the one or more devices;
   calculating one or more similarities between the information from the one or more nearby devices and metadata corresponding to one or more content files stored in a storage, the metadata being associated with identifiers of one or more nearby devices at the time of storage of the one or more content files, the calculating comprising:
      calculating a set coverage ratio by:
         calculating a size of a difference between a first set of identifiers of the one or more nearby devices at the time of storage of the one or more content files and a second set of identifiers of the one or more nearby devices when the content file creation event is detected,
         subtracting the calculated size of the difference from a size of an intersection of the first set of identifiers and the second set of identifiers, and
         dividing a result of the subtracting by the size of the first set of identifiers resulting in the calculated set coverage ratio, wherein the calculated one or more similarities increase proportionally to the calculated set coverage ratio,
      identifying locations of the one or more devices nearby the electronic device when the content list creation event is detected, and
      calculating an area of a cluster of the one or more nearby devices based on an area formed by the identified locations of the one or more devices nearby the electronic device when the content list creation event is detected, wherein the one or more similarities increase& inversely proportionally to the calculated area; and
   generating a content list based at least in part on the calculated one or more similarities.

17. The method of claim 16, wherein the generating the content list includes making a list of at least a part of the one or more content files and thumbnails thereof.

18. A non-transitory computer-readable storage medium which stores a program for causing an electronic device to perform operations, the program comprising:
   a nearby device information gathering unit configured to obtain information regarding one or more devices nearby the electronic device, the information being associated with identifiers of the one or more nearby devices;
   a content ranking unit configured to determine relevance of one or more content files stored in a storage based at least in part on metadata corresponding to the one or more content files stored and the information regarding the one or more nearby devices when a content list creation event is triggered, the metadata being associated with identifiers of one or more nearby devices at the time of storage of the one or more content files, the content ranking unit further configured to:
   calculate one or more similarities between the one or more metadata of the one or more content files and the obtained information on the one or more nearby devices when the content list creation event is triggered by:
      calculating a size of a difference between a first set of identifiers of the one or more nearby devices at the time of storage of the one or more content files and a second set of identifiers of the one or more nearby devices when the content list creation event is triggered,
      subtracting the calculated size of the difference from a size of an intersection of the first set of identifiers and the second set of identifiers, and
      dividing a result of the subtracting by the size of the first set of identifiers resulting in the calculated one or more similarities, wherein the determined relevance increases proportionally to the calculated one or more similarities,
   identify locations of the one or more devices nearby the electronic device when the content list creation event is triggered, and
   calculate an area of a cluster of the one or more nearby devices based on an area formed by the identified locations of the one or more devices nearby the electronic device when the content list creation event is triggered, wherein the determined relevance increases inversely proportionally to the calculated area; and
   a content list presenting unit configured to present a content list in order of the determined relevance determined by the content ranking unit when the content list creation event is triggered.

19. The non-transitory computer-readable storage medium of claim 18, wherein the storage is configured to store the one or more content files with the information regarding the one or more nearby devices obtained by the nearby device information gathering unit.

20. The non-transitory computer-readable storage medium of claim 18, wherein the nearby device information gathering unit is further configured to obtain the information regarding the one or more nearby devices when at least one of a content file creation event and the content list creation event is triggered.

21. The non-transitory computer-readable storage medium of claim 18, wherein the nearby device information gathering unit is further configured to obtain the information regarding the one or more nearby devices using at least one of Bluetooth, Wi-Fi and GPS.

22. A non-transitory computer-readable storage medium which stores a program for causing an electronic device to present a content list, the program comprising:
   a nearby device information gathering module configured to obtain information regarding one or more devices nearby the electronic device, the information is associated with identifiers of the one or more nearby devices; and
   a content ranking module configured to determine relevance of one or more content files stored in the electronic device based at least in part on metadata corresponding to the one or more content files stored and the information regarding the one or more nearby devices when a content list creation event is triggered, the metadata being associated with identifiers of one or more nearby devices at the time of storage of the one or more content files, the content ranking unit further configured to:
   calculate one or more similarities between the one or more metadata of the one or more content files and the obtained information on the one or more nearby devices when the content list creation event is triggered by:
      calculating a size of a difference between a first set of identifiers of the one or more nearby devices at the time of storage of the one or more content files and a second set of identifiers of the one or more nearby devices when the content list creation event is triggered,
      subtracting the calculated size of the difference from a size of an intersection of the first set of identifiers and the second set of identifiers, and
      dividing a result of the subtracting by the size of the first set of identifiers resulting in the calculated one or more similarities, wherein the determined relevance increases proportionally to the calculated similarities,
   identify locations of the one or more devices nearby the electronic device when the content list creation event is triggered, and
   calculate an area of a cluster of the one or more nearby devices based on an area formed by the identified locations of the one or more devices nearby the electronic device when the content list creation event is triggered, wherein the determined relevance increases inversely proportionally to the calculated area.

* * * * *

UNITED STATES PATENT AND TRADEMARK OFFICE
CERTIFICATE OF CORRECTION

| | | |
|---|---|---|
| PATENT NO. | : 9,292,526 B2 | Page 1 of 1 |
| APPLICATION NO. | : 13/642689 | |
| DATED | : March 22, 2016 | |
| INVENTOR(S) | : Kurabayashi et al. | |

It is certified that error appears in the above-identified patent and that said Letters Patent is hereby corrected as shown below:

Specification

In Column 1, Line 8, delete "§371" and insert -- § 371 --, therefor.

Claims

In Column 15, Line 17, in Claim 10, delete "(SSI Ds)" and insert -- (SSIDs) --, therefor.

In Column 15, Line 26, in Claim 12, delete "(SSI Ds)" and insert -- (SSIDs) --, therefor.

In Column 16, Line 13, in Claim 16, delete "increase&" and insert -- increase --, therefor.

Signed and Sealed this
Twelfth Day of July, 2016

Michelle K. Lee
*Director of the United States Patent and Trademark Office*